United States Patent
Oh et al.

(10) Patent No.: US 11,167,650 B2
(45) Date of Patent: Nov. 9, 2021

(54) DRIVING TORQUE COMMAND GENERATING APPARATUS AND METHOD OF ECO-FRIENDLY VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 229 days.

(21) Appl. No.: 16/195,195

(22) Filed: Nov. 19, 2018

(65) Prior Publication Data
US 2019/0366855 A1 Dec. 5, 2019

(30) Foreign Application Priority Data
Jun. 4, 2018 (KR) .................. 10-2018-0064284

(51) Int. Cl.
*B60L 15/20* (2006.01)
*B60L 50/51* (2019.01)
(Continued)

(52) U.S. Cl.
CPC ............ *B60L 15/20* (2013.01); *B60L 50/51* (2019.02); *B60K 1/04* (2013.01); *B60K 6/40* (2013.01);
(Continued)

(58) Field of Classification Search
CPC ...... B60L 15/20; B60L 50/51; B60L 2210/40; B60L 2240/423; B60L 2250/26; B60L 2240/461; B60L 2240/421; B60L 2240/12; B60L 2270/142; B60L 2270/145; B60Y 2200/91; B60Y 2200/92; B60K 6/40; B60K 1/04; B60K 2006/268; B60K 2006/4825; B60K 6/442; Y02T 10/70; Y02T 10/64; Y02T 10/72; Y02T 10/62;
(Continued)

(56) References Cited

U.S. PATENT DOCUMENTS

2020/0259431 A1* 8/2020 Sawada .............. B60L 15/2009

FOREIGN PATENT DOCUMENTS

| KR | 101448746 B1 | 10/2014 |
|---|---|---|
| KR | 101704243 B1 | 2/2017 |

* cited by examiner

*Primary Examiner* — Michael V Kerrigan
(74) *Attorney, Agent, or Firm* — Mintz Levin Cohn Ferris Glovsky and Popeo, P.C.; Peter F. Corless

(57) ABSTRACT

A driving torque command generating apparatus of a vehicle may include: a driving input sensor configured to detect a driving input value of a driver, including a pedal input value, in response to a manipulation of an accelerator pedal of the vehicle; a motor speed sensor configured to detect a motor speed of a drive motor of the vehicle; a wheel speed sensor configured to detect a wheel speed of a wheel of the vehicle; and a controller configured to obtain torsional state observation value information, which indicates a torsional state observation value derived from a vehicle drive system of the vehicle, according to the detected motor speed, the detected wheel speed, and a previously-generated motor torque command, and to generate a motor torque command based on the detected driving input value and the obtained torsional state observation value information.

22 Claims, 4 Drawing Sheets

(51) Int. Cl.
*B60K 6/40* (2007.10)
*B60K 1/04* (2019.01)

(52) U.S. Cl.
CPC ..... *B60L 2210/40* (2013.01); *B60L 2240/421* (2013.01); *B60L 2240/423* (2013.01); *B60L 2240/461* (2013.01); *B60L 2250/26* (2013.01); *B60Y 2200/91* (2013.01); *B60Y 2200/92* (2013.01)

(58) Field of Classification Search
CPC ....... B60W 2710/085; B60W 2540/12; B60W 2050/0008; B60W 30/20; B60W 2540/10; B60W 2510/081; B60W 2520/28; B60W 2030/206; B60W 10/08; B60W 40/00; B60W 2710/083
See application file for complete search history.

[FIG. 1]
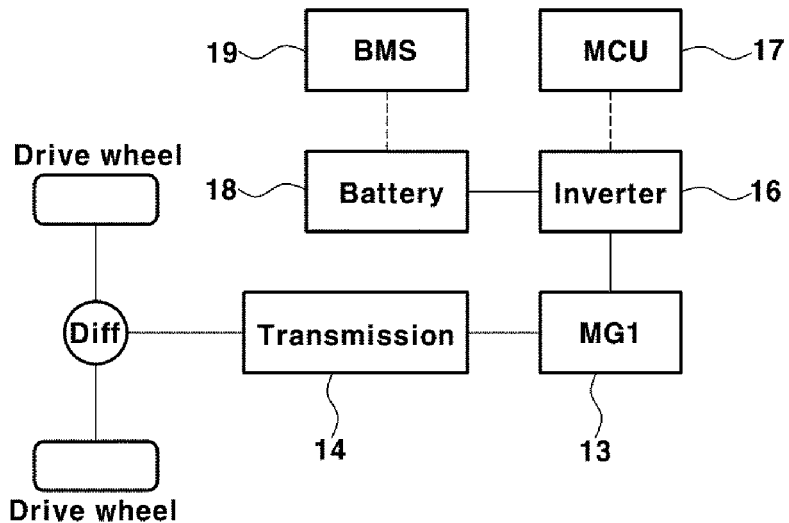
[FIG. 2]
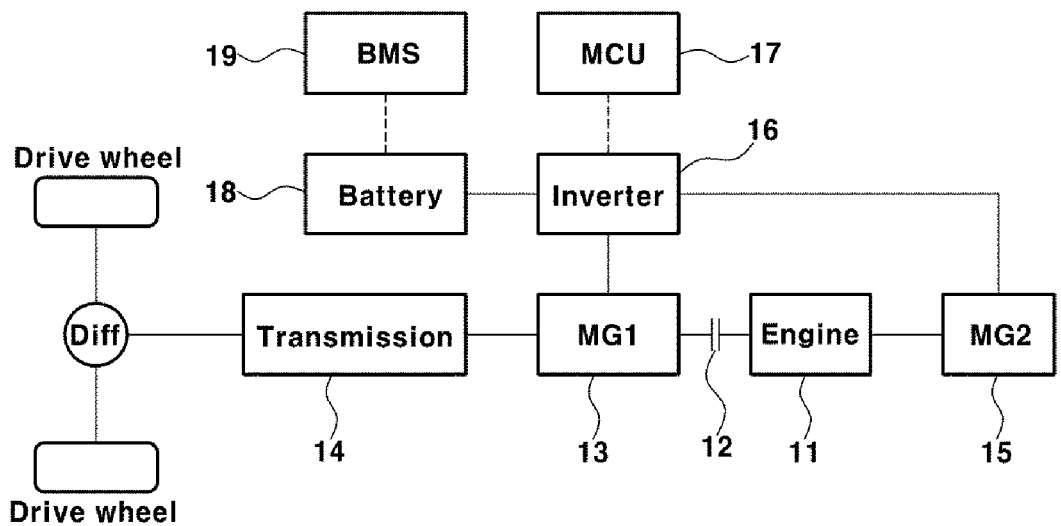

[FIG. 3]
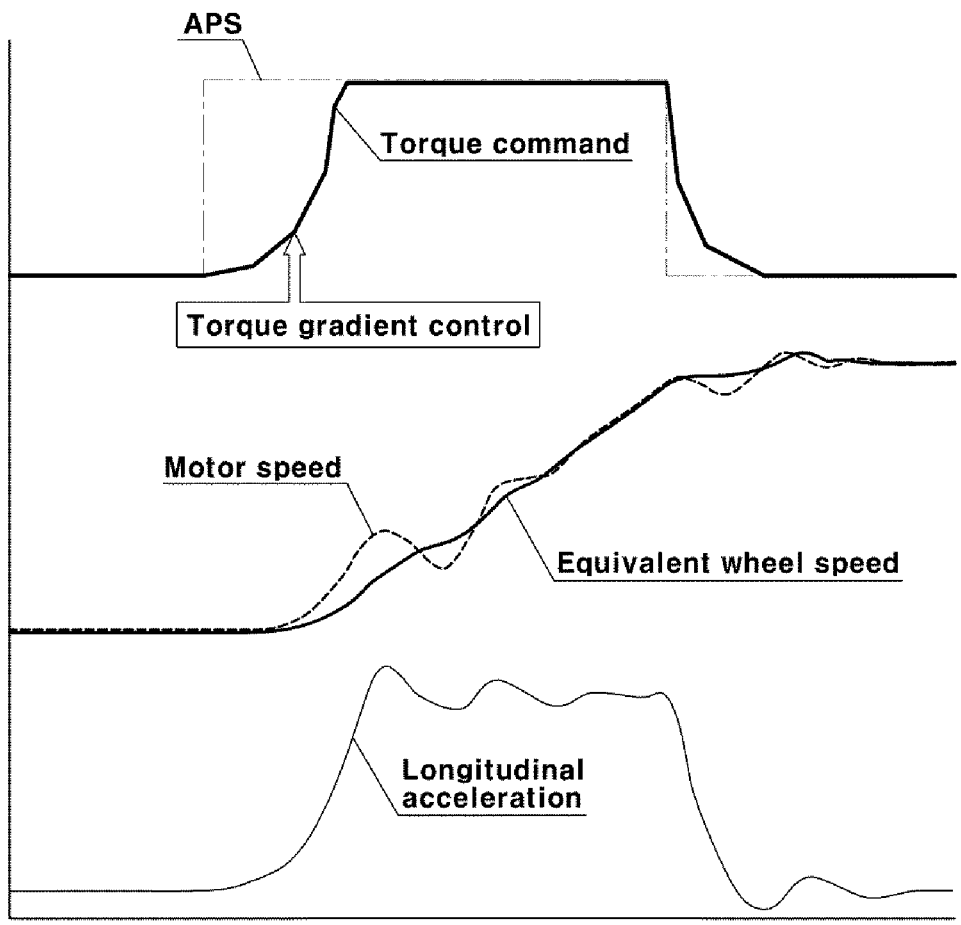
[FIG. 4]
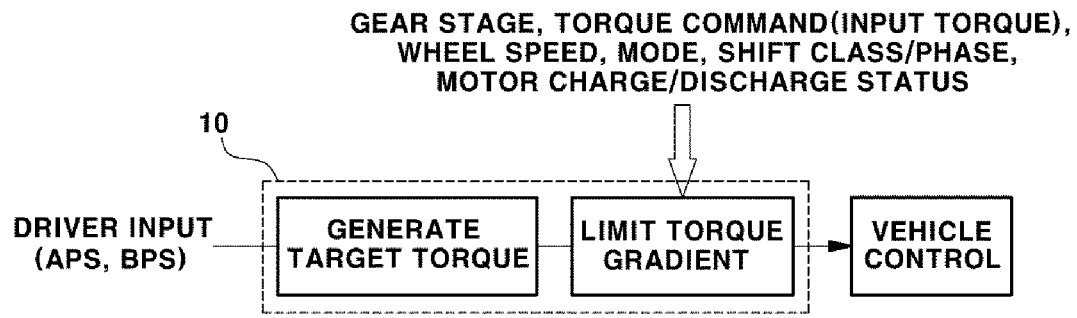

[FIG. 5]
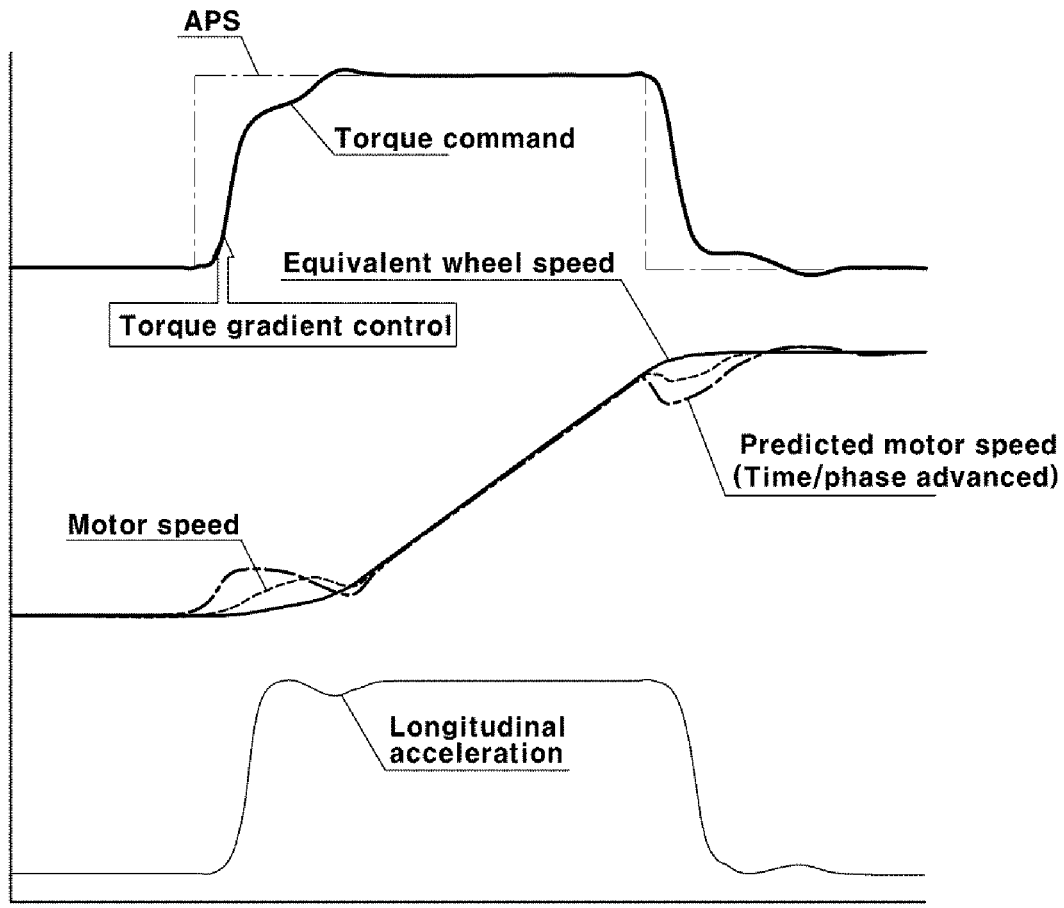
[FIG. 6]
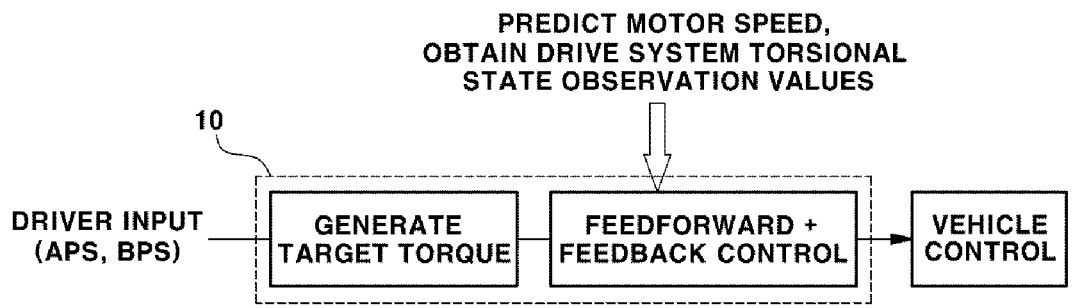

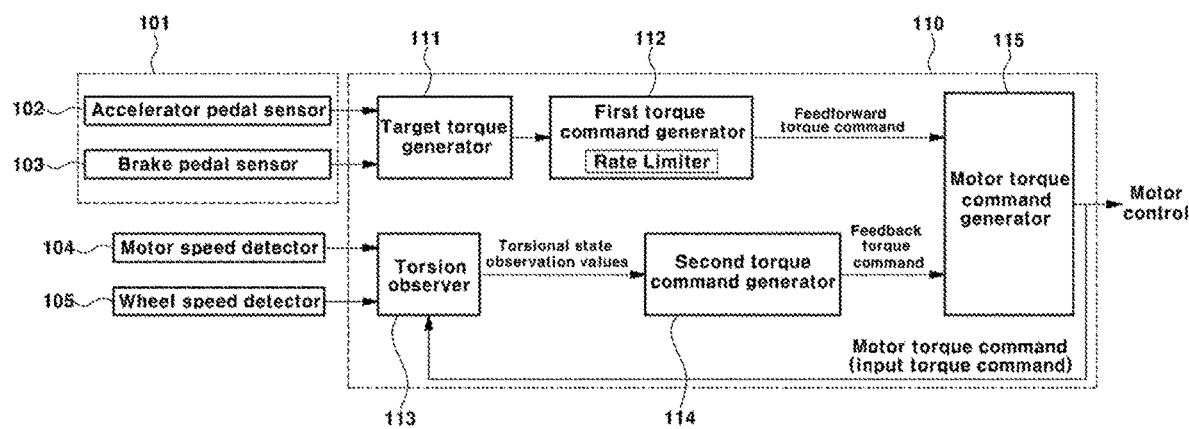
[FIG. 7]

DRIVING TORQUE COMMAND GENERATING APPARATUS AND METHOD OF ECO-FRIENDLY VEHICLE

CROSS-REFERENCE TO RELATED APPLICATION

The present application claims priority to Korean Patent Application No. 10-2018-0064284, filed on Jun. 4, 2018 in the Korean Intellectual Property Office, the entire contents of which are incorporated herein by reference.

BACKGROUND OF THE DISCLOSURE

Field of the Disclosure

The present disclosure relates generally to a driving torque command generating apparatus and method and, more particularly, to a driving torque command generating apparatus and method of an eco-friendly vehicle capable of obtaining the response of a vehicle to a driver's input while effectively reducing noise, vibration, and harshness (NVH).

Description of the Related Art

As is well-known in the art, eco-friendly vehicles, such as electric vehicles (EVs) and hybrid electric vehicles (HEVs), are propelled by electric motors. Electric vehicles are propelled only by an electric motor using energy stored in a battery, while hybrid electric vehicles are propelled by efficiently combining power from an engine and power from an electric motor.

Other eco-friendly vehicles include fuel cell electric vehicles (FCEVs) propelled by an electric motor using electric power generated by fuel cells. FCEVs are also propelled by an electric motor, similar to an EV and an HEV.

FIG. 1 is a view illustrating a conventional system configuration of an electric vehicle (EV). As illustrated in FIG. 1, the EV may include a drive motor (MG1) 13, a drive shaft, a transmission 14, and drive wheels mechanically connected to each other. In addition, the EV may further include an inverter 16 and a motor control unit (MCU) 17 operating and controlling the drive motor 13, a high-voltage battery 18 supplying operating power to the drive motor 13, and a battery management system (BMS) 19 controlling and managing the battery 18.

The battery 18, which acts as a source of propulsion (power source) of the vehicle, is chargeably and dischargeably connected to the drive motor 13 via the inverter 16. The inverter 16 applies three-phase alternating current (AC), produced by transforming direct current (DC) supplied by the battery 18, to the drive motor 13 in order to operate the drive motor 13.

The battery controller 19 collects battery status information, such as a voltage, a temperature, a state of charge (SOC) of the battery 18, and provides the battery status information collected to the other controllers in the vehicle or uses the battery status information collected for charge/discharge control over the battery 18.

FIG. 2 is a view illustrating a conventional system configuration of a hybrid electric vehicle (HEV), more particularly, a powertrain configuration a transmission mounted electric device (TMED)-type HEV.

As illustrated in FIG. 2, the system configuration of the HEV includes an engine 11 and a drive motor 13 disposed in series as power sources for propelling the vehicle, an engine clutch 12 configured to connect or disconnect power between the engine 11 and the drive motor 13, a transmission 14 transmitting power from the engine 11 and the drive motor 13 to a drive shaft while by a speed conversion, a transmission 14 performing a speed conversion while transmitting power from the engine 11 and the drive motor 13 to a drive shaft, and a starter-generator (MG2) 15 directly connected to the engine 11 such that starter-generator 15 can transmit power to the engine 11. The engine clutch 12 connects or disconnects power between two driving sources of the vehicle, i.e., the engine and the drive motor 13, through a closing or opening operation.

In addition, the battery 18 acting as a source of propulsion (or power source) of the vehicle is chargeably/dischargeably connected to the drive motor 13 and the starter-generator 15 via the inverter 16. The inverter 16 applies three-phase AC, produced by transforming DC supplied by the battery 18, to the drive motor 13 and the starter-generator 15 in order to operate the drive motor 13 and the starter-generator 15. The starter-generator 15 is a device performing a combined function of a starter motor and a generator. The starter-generator 15 starts the engine 11 by transmitting power thereof to the engine 11 via a power transmission device (e.g., a belt or a pulley), generates electric energy using torque received from the engine, or charges the battery 18 with electric energy generated thereby.

Problematically, it can be difficult to obtain a response of the vehicle to a driving input of the driver, such as manipulation of the accelerator pedal or the brake pedal, while reducing noise, vibration, and harshness (NVH) problems caused by a significant change in driving force. Gradient limitation and filters having a variety of conditions as factors are often used in eco-friendly vehicles in order to generate an optimum motor torque command able to remove the above-described trade-off relationship when assigning a level of driving force to a vehicle-driving source, for example, generating a torque command to a drive motor. In addition, eco-friendly vehicles may use a controller to perform active feedback torque correction control for reducing already-generated vibration using the motor. However, such control technology requires an excessive number of process steps in order to develop the controller.

Recently, for driving-customized control according to driver's propensity, a driving force command has been generated using a dual or diversified method, depending on a driving mode and/or driving conditions. In this case, the number of process steps may be significantly increased depending on diversified types, which is problematic. In addition, active vibration reducing control technology performed by correcting motor torque has been introduced. However, in this technology, a time delay occurs causing reflection of a motor characteristic from a point in time at which vibration is actually detected to a point in time at which vibration reducing control is performed. Consequently, vibration is not effectively reduced.

Conventionally, a model speed of a motor has been generated using a disturbance observer, and vibration has been canceled based on the difference between the model speed of the motor and an actual speed of the motor. Furthermore, a method of substituting wheel speed-based calculation for the disturbance observer has been proposed. However, control of the motor can be difficult due to a time delay present between a point in time at which vibration generated by disturbance is detected and a point in time at which corresponding motor torque is generated and an additional time delay caused by a Q-filter to filter a vibration component.

Meanwhile, a model speed of a motor can be generated using a model, and vibration can be canceled based on the difference between the model speed of the motor and an actual speed of the motor. In this case, however, the above-described problem due to time delay still exists. In addition, an additional time delay occurs when an extracted vibration component is filtered Although both of the above-described conventional solutions are intended to address NVH occurring in vehicles due to disturbance, none of these is intended to overcome NVH problems caused by a sudden vehicle manipulation or a driving input of the driver. In addition, a problematic time delay occurs from a point in time at which vibration is generated to a point in time in which motor torque is controlled.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art. The present disclosure is intended to propose a driving torque command generating apparatus and method of an eco-friendly vehicle, the apparatus and method being able to obtain rapid reaction and response of a vehicle to a driving input of a driver while effectively reducing noise, vibration, and harshness (NVH) problems caused by torsion and backlash of a drive system, even if a significant change in driving force is caused by the driving input of the driver.

The object of the present disclosure is not limited to the aforementioned description, and other objects not explicitly disclosed herein will be clearly understood by those skilled in the art to which the present disclosure pertains from the description provided hereinafter.

In order to achieve the above object, according to embodiments of the present disclosure, a driving torque command generating apparatus of a vehicle may include: a driving input sensor configured to detect a driving input value of a driver, including a pedal input value, in response to a manipulation of an accelerator pedal of the vehicle; a motor speed sensor configured to detect a motor speed of a drive motor of the vehicle; a wheel speed sensor configured to detect a wheel speed of a wheel of the vehicle; and a controller configured to obtain torsional state observation value information, which indicates a torsional state observation value derived from a vehicle drive system of the vehicle, according to the detected motor speed, the detected wheel speed, and a previously-generated motor torque command, and to generate a motor torque command based on the detected driving input value and the obtained torsional state observation value information.

Furthermore, according to embodiments of the present disclosure, a driving torque command generating method of a vehicle may include: detecting, by a driving input sensor, a driving input value of a driver, including a pedal input value, in response to a manipulation of an accelerator pedal of the vehicle; detecting, by a motor speed sensor, a motor speed of a drive motor of the vehicle; detecting, by a wheel speed sensor, a wheel speed of a wheel of the vehicle; obtaining, by a controller, torsional state observation value information, which indicates a torsional state observation value derived from a vehicle drive system of the vehicle, according to the detected motor speed, the detected wheel speed, and a previously-generated motor torque command; and generating, by the controller, a motor torque command based on the detected driving input value and the obtained torsional state observation value information.

According to embodiments of the present disclosure, the driving torque command generating apparatus and method of a vehicle (e.g., an eco-friendly vehicle, such as an EV, HEV, or the like) can obtain rapid reaction and response of a vehicle to a driving input of a driver while effectively reducing NVH problems caused by torsion and backlash of the drive system even in the case in which a significant change in driving force is caused by the driving input.

In addition, according to embodiments of the present disclosure, upon overcoming NVH problems caused by torsion and backlash of the drive system, it is possible to effectively set the torque command filter or torque gradient in a situation-specific manner by considering a number of factors. It is also possible to reduce the number of process steps involved in conventional solutions for torque gradient control. In addition, since a torque command suitable for a specific point in time can be generated in real-time, an improvement in efficiency can be expected.

In particular, according to embodiments of the present disclosure, a driving torque command is generated by previously observing a result of backlash or vibration of the drive system depending on a change in torque before the torque is actually generated. It is, therefore, possible to effectively reduce NVH problems even in the case in which a unique control delay time is present in the motor.

BRIEF DESCRIPTION OF THE DRAWINGS

The above and other objects, features and other advantages of the present disclosure will be more clearly understood from the following detailed description when taken in conjunction with the accompanying drawings, of which:

FIG. 1 is a view illustrating a conventional system configuration of an EV;

FIG. 2 is a view illustrating a conventional system configuration of an HEV;

FIGS. 3 and 4 are views illustrating a known torque gradient control, i.e., a control method in which torque gradient limitation is performed;

FIGS. 5 and 6 are views illustrating a feedback control method using a driving torque command generated according to embodiments of the present disclosure; and FIG. 7 is a block diagram illustrating a configuration of a driving torque command generating apparatus according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings so that a person having ordinary skill in the art to which the present disclosure relates could easily put the present disclosure into practice. However, the present disclosure is not limited to the embodiments described herein and may be embodied in other form.

The terms "comprise," "include," "have," and any variations thereof used throughout the specification are intended to cover a non-exclusive inclusion unless explicitly described to the contrary.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

In an "eco-friendly" vehicle, a drive system including a vehicle drive source (i.e., an engine and a motor or a motor), a transmission (or a reducer), a drive shaft, and drive wheels may be regarded as rigid bodies integrally rotating. However, in the case of actual driving, torsion may occur in the drive system from the vehicle drive source to the drive wheels. In particular, torsion may occur in the drive system when a significant amount of driving torque is suddenly changed, for example, a driver suddenly and forcefully presses the accelerator pedal or suddenly removes a foot from the accelerator pedal.

Accordingly, in the case of sudden manipulation of the vehicle by the driver or a sudden driving input of the driver (e.g., in the case of sudden manipulation of the accelerator pedal), vibration and noise may be generated due to torsion and backlash of the drive system.

However, conventional solutions, such as those described hereinabove, are merely intended to overcome NVH problems caused by disturbance but are not intended to overcome NVH problems caused by sudden manipulation of the vehicle by the driver or a driving input of the driver. That is, unlike the conventional solutions intended to overcome NVH problems caused by disturbance, a method of using gradient limitation and a filter having a variety of conditions as factors to generate an optimum driving force command (or a driving torque command) to overcome problems due to torsion of the drive system in eco-friendly vehicles has been known in the art.

In the following description, the driving force command means a torque command to a driving source configured to propel a vehicle, as well as a driving torque command for controlling the operation of the driving source of the vehicle. For example, the driving force command means a torque command to a drive motor (hereinafter, referred to as a "motor").

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIGS. 3 and 4 are views illustrating a known torque gradient control, i.e., a control method in which torque gradient limitation is performed.

In FIGS. 3 and 4, APS and BPS indicate an acceleration position sensor and a brake pedal sensor, respectively.

As illustrated in FIG. 3, a known method using torque gradient limitation performs torque gradient control using a rate limiter to provide a gentle rise in a motor torque command even in the case in which a driver suddenly manipulates the accelerator pedal (i.e., even in the case of a sudden rise in an APS signal).

However, even in the case in which the torque gradient control is performed, there may be a difference between a motor speed and an equivalent wheel speed (i.e., a speed obtained by multiplying a wheel speed with a motor-wheel gear ratio (i.e., a gear ratio between the drive motor and the drive wheels) and a wheel speed offset correction factor) due to torsion of the drive shaft or the like.

In addition, since the torque gradient control is performed, a gently-rising motor torque command is generated, even in the case of sudden pressing of the accelerator pedal by the driver. Consequently, the operation of the motor is controlled by the gently-rising torque command, a vehicle reaction of raising acceleration (i.e., longitudinal acceleration) is slowed.

Referring next to FIG. 4, a controller 10 controls the vehicle in response to user inputs made by manipulating an accelerator pedal or a brake pedal (e.g., an APS value and a BPS value). More particularly, when a target torque for controlling a motor torque output, a rate limiter in the controller 10 limits the gradient of the motor torque command, depending on variables, such as a gear stage, a motor torque (or a torque command), a wheel speed, a mode, a shift class/phase, and a motor charge/discharge status.

Except for NVH problems caused by disturbances, backlash due to a gap in gear engagement or torsion of the drive shaft in the drive system leads to most NVH problems in the drive system.

Thus, a control method for reducing the backlash-induced problems, i.e., a backlash-reducing control method, is demanded.

If the gradient of the torque command is controlled such that the torque command changes as slowest and most gradient as possible when the driver manipulates the accelerator pedal, the NVH problems in the drive system, due to the backlash or torsion, can be removed to some extent.

However, a slow and gradient change in torque may not provide a rapid response, thereby increasing the difference between a vehicle behavior desired by a driver and an actual vehicle behavior. This may cause a difference to be felt in the case of acceleration or deceleration, thereby degrading drivability.

Referring to FIG. 3, it can be appreciated that, even in the case in which the driver suddenly presses the accelerator pedal (i.e., even in the case of the sudden rise in the APS), the motor torque command increases at a gentle gradient and the vehicle acceleration (i.e., longitudinal acceleration) increases after a time delay after the pressing on the acceleration pedal.

To overcome this trade-off relationship, in the related art, work of experimentally discovering an optimum torque gradient value and an optimum filter constant to apply the torque gradient control and the filter has been required. At this time, the entirety of variables, such as a gear stage, a motor torque (or a torque command), a wheel speed, a mode, a shift class/phase, and a motor charge/discharge status, must be considered.

Accordingly, the present disclosure is intended to propose a method of generating a motor torque command based on torsion of the drive system in order to overcome the above-described problems, so that an optimum torque command for overcoming NVH problems can be generated in real-time.

In the drive system of an eco-friendly vehicle, including the drive motor (hereinafter, referred to as the "motor"), the transmission (or the reducer), and the drive shaft, when the torsion of the drive system is calculated only based on the difference between a measured motor speed and an equivalent wheel speed (i.e., a speed obtained by multiplying a wheel speed with a motor-wheel gear ratio), a time delay between a point in time of actual occurrence of torsion and a point in time at which the motor torque follows the torque command for reducing the torsion. Accordingly, the effect of reducing the torsion may be insignificant or the torsion may be unintentionally increased due to a phase difference.

Accordingly, it is necessary to predict the amount of torsion considering the time delay and correct the motor torque command responsively to the predicted amount of torsion. That is, when the actual motor speed is faster than the equivalent wheel speed, adjustment of reducing the motor torque command by a value corresponding to the predicted amount of torsion is necessary. When the actual motor speed is slower than the equivalent wheel speed, adjustment of increasing the motor torque command by a value corresponding to the predicted amount of torsion is necessary.

Hereinafter, a torque command generating apparatus and method according to the present disclosure will be described in detail with reference to the drawings.

FIGS. 5 and 6 are views illustrating a feedback control method using a driving torque command generated according to embodiments of the present disclosure, and FIG. 7 is a block diagram illustrating a configuration of a driving torque command generating apparatus according to embodiments of the present disclosure.

First, describing the configuration of the torque command generating apparatus according to embodiments of the present disclosure, the torque command generating apparatus may include: a driving input sensor 101 detecting driving input values when the driver has input driving inputs to the vehicle; a motor speed sensor 104 detecting a motor speed; a wheel speed sensor 105 detecting a wheel speed; and a controller 110 obtaining torsional state observation value information regarding torsional state observation values, i.e., values obtained by observing the torsional state of the vehicle drive system, using information regarding the motor speed and the wheel speed detected and input using the motor speed sensor 104 and the wheel speed sensor 105, and generating a motor torque command based on the driving input values input by the driving input sensor 101 and the torsional state observation value information.

Here, the driving input sensor 101 may be a typical accelerator pedal sensor (APS) 102 and a brake pedal sensor (BPS) 103, which are typical sensors detecting an accelerator pedal input value and a brake pedal input value of the driver. The driving input values are pedal input values in response to the manipulation of the accelerator pedal and the brake pedal by the driver (i.e., an APS signal value and a BPS signal value indicating pedal positions, displacements of pedal manipulation, and the like).

In addition, the motor speed sensor (alternatively referred to herein as "motor speed detector") 104 detecting the motor speed may be a sensor (e.g., resolver) disposed on a motor of an eco-friendly vehicle (e.g., EV, HEV, etc.), and the wheel speed sensor 105 (alternatively referred to herein as "wheel speed detector") detecting the wheel speed may be a wheel speed sensor disposed on a wheel of the vehicle.

In addition, the controller 110 may be a hybrid control unit (HCU) in the case of a hybrid electric vehicle (HEV), a vehicle control unit (VCU) in the case of an electric vehicle (EV), or a fuel cell system controller in the case of a fuel cell electric vehicle (FCEV).

The controller 110 includes a target torque generator 111 receiving the driving input values of the driver (e.g., APS signal values and BPS signal values), detected by the driving input sensor 101. The target torque generator 111 generates a target torque, with which the motor is to be controlled, from the detected driving input values, and outputs the generated target torque.

In addition, the controller 110 further comprises a first torque command generator 112 determining a torque gradient based on current vehicle status information collected from the vehicle, generating a feedforward torque command from the target torque generated and output by the target torque generator 111, as a torque value with the gradient thereof varying at the predetermined torque gradient, and outputting the feedforward torque.

Here, the first torque command generator 112 includes a rate limiter 112a limiting and controlling the torque gradient. When the torque gradient is determined according to the vehicle status information, the first torque command generator 112, using the target torque output by the target torque generator 111 as an input, determines a torque value from the target torque, the torque value varying at the determined torque gradient, and outputs the determined torque value as a feedforward torque command.

The vehicle status information, a variable with which the rate limiter 112a determines the torque gradient, may be implemented using the gear stage and the wheel speed. The torque gradient may be determined based on the gear stage and the wheel speed.

According to embodiments of the present disclosure, the rate limiter is not limited to any limiter using a specific method to limit and control the torque gradient as long as the rate limiter can control the torque gradient depending on variables to some extent. A known rate limiter or a modified rate limiter, in which variables or the like are simplified in consideration of conditions of the vehicle or conditions of the controller, may be applied.

The controller 110 further includes a torsion observer 113 receiving the motor speed and the wheel speed detected by the motor speed sensor 104 and the wheel speed sensor 105 and the motor torque command previously generated and output by a motor torque command generator 115, which will be described later, and generating and outputting the torsional state observation values by observing (or predicting) the torsional state of the vehicle drive system from the motor speed and the wheel speed, detected as above, and the motor torque command.

According to embodiments of the present disclosure, the torsional state observation values include a torsional velocity, a value of torsional acceleration, and a torsion angle obtained from the detected motor speed, the detected wheel speed, and the motor torque command.

In addition, the controller further includes a second torque command generator 114 generating and outputting a feedback torque command to reduce the torsion of the vehicle drive system, based on the torsional state observation values output by the torsion observer 113.

In addition, the controller 110 further includes a motor torque command generator 115 generating a final motor torque command from the feedforward torque command output by the first torque command generator 112 and the feedback torque command output by the second torque command generator 114.

Here, the motor torque command generator 115 generates the final motor torque command by correcting the feedforward torque command by the feedback torque command intended for torsion reduction.

The feedback torque command generated by the second torque command generator 114 is determined as a torque command to the motor, i.e., a command for generating a motor torque in a direction in which the torsion of the drive system can be reduced. Here, the motor torque command generator 115 determines the final motor torque command as a value obtained by adding the feedforward torque command and the feedback torque command.

Hereinafter, the components and processes of the driving torque command generating apparatus will be described in more detail. When the driver manipulates the accelerator pedal or the brake pedal, the driving input sensor 101 detects a driving input value according to the manipulation of the accelerator pedal or the brake pedal by the driver. The driving input value detected by the driving input sensor 101 is input to the controller 110 in real-time.

During driving of the vehicle, the motor speed sensor 104 and the wheel speed sensor 105 detect a motor speed and a wheel speed. The motor speed and the wheel speed detected by the motor speed sensor 104 and the wheel speed sensor 105 are input to the controller 110 in real-time.

Here, the driving input value is input to the target torque generator 111 of the controller 110 to be used to generate a target torque. The motor speed and the wheel speed detected above are input to the torsion observer 113 of the controller 110 to be used to determine and generate torsional state observation values of the drive system.

According to embodiments of the present disclosure, the process of generating, by the target torque generator 111, the target torque based on the driving input value of the driver is not different from the known method in which the controller generates a target torque of a motor torque according to a driving input value of a driver in a typical eco-friendly vehicle.

Since the above-described method of generating the target torque by the target torque generator 111 may be regarded as a technical feature known in the art, a detailed description thereof will be omitted herein.

In addition, the first torque command generator 112 generates a feedforward torque command as a value determined according to a torque gradient, using the target torque generated by the target torque generator 111 as an input.

Accordingly, as described above, the feedforward torque command generated by the first torque command generator 112 is transferred to the motor torque command generator 115. The motor torque command generator 115 uses the feedforward torque to generate a final motor torque command.

In addition, the torsion observer 113 of the controller 110 obtains torsional state observation value information using the motor speed, the wheel speed, and the motor torque command finally output by the motor torque command generator 115 of the controller.

As described above, the torsion observer 113 determines the torsional state observation values indicating the amount or degree of torsion by observing and predicting the torsional state based on the motor torque command. In the process of observing and predicting the torsional state, motor speed information and wheel speed information, which are real-time measurements, as well as the motor torque command previously-determined and output by the motor torque command generator 115, are input and used.

Formulas 1 and 2, which are provided below, are used by the torsion observer 113 to observe and predict the torsional state. The motor torque command may be used as an input instead of an actually-generated motor torque, and the torsional state of the drive system may be previously predicted and observed using the motor speed, the wheel speed, and the motor torque command.

The motor speed detected by the motor speed sensor 104 is referred to as a feedback value, and the motor speed observed (or predicted) is set so as not to diverge from the measured motor speed.

In addition, response may be improved when a value obtained by multiplying a difference value between an equivalent wheel speed $\omega_w^*$ and a motor speed $\omega_m$ with a drive system torsional stiffness constant $k_t$ is used for the feedforward term of an output torque. The equivalent wheel speed $\omega_w^*$ is obtained from a wheel speed measured by the wheel speed sensor 105 (hereinafter, referred to as a "measured wheel speed"), and the motor speed co. (hereinafter, referred to as the "measured motor speed") is detected by the motor speed sensor 104.

Formula 3, which is provided below, is used to calculate the equivalent wheel speed. According to Formula 3, the equivalent wheel speed $\omega_w^*$ may be calculated using a current gear ratio r and a wheel speed offset correction factor $\alpha$ in the measured wheel speed $\omega_m$.

$$\dot{\hat{\omega}}_m = \frac{1}{J_m} T_{in} - \frac{1}{J_m} \hat{T}_t + L_p(\omega_m - \hat{\omega}_m) \quad \text{[Formula 1]}$$

$$\dot{\hat{T}}_t = k_t(\omega_m - \omega_w^*) - L_i(\omega_m - \hat{\omega}_m) \quad \text{[Formula 2]}$$

$$\omega_w^* = \alpha \cdot r \cdot \omega_w \quad \text{[Formula 3]}$$

Herein, the symbols will be defined as follows:
$J_m$: Motor rotational inertia
$\omega_m$: Measured motor speed
$k_t$: Drive system torsional stiffness
$\hat{\omega}_m$: Observed motor speed
r: Current gear ratio
$\omega_w$: Measured wheel speed
$L_p$: Observer feedback P-gain
$\omega_w^*$: Equivalent wheel speed
$L_i$: Observer feedback I-gain
$T_{in}$: Input torque command
$\alpha$: Wheel speed offset correction factor
$\hat{T}_t$: Observed output torque In Formulas 1 and 2, the motor rotational inertia $J_m$, the drive system torsional stiffness $k_t$, the feedback P-gain $L_p$, and the feedback I-gain $L_i$ are set pieces of information previously input and stored in the torsion observer (i.e., an observer) 113.

In addition, in Formula 1, the input torque command $T_{in}$ is a torque command input to the torsion observer 113, i.e., a motor torque command finally generated by the motor torque command generator 115 and input to the torsion observer 113.

The measured wheel speed $\omega_w$ used by the torsion observer 113 may be obtained based on the drive wheels of the vehicle or be a value obtained by correcting a deviation between a left wheel and a right wheel or a deviation between a front wheel and a rear wheel.

For example, the measured wheel speed $\omega_w$ may be an average speed of a left wheel speed and a right wheel speed or an average speed of a front wheel and a rear wheel.

The wheel speed information is used in Formula 2. The wheel speed used by the torsion observer 113 of the controller 110 may be a wheel speed from the point of view of the motor, i.e., the equivalent wheel speed $\omega_w^*$, calculated in consideration of the motor-wheel gear ratio r after the deviation between a left wheel and a right wheel or the deviation between a front wheel and a rear wheel is corrected.

As represented by Formula 3, the equivalent wheel speed $\omega_w^*$ may be calculated by multiplying the wheel speed detected by the wheel speed sensor 105, i.e., the measured wheel speed $\omega_m$, with the motor-wheel gear ratio r and the wheel speed offset correction factor $\alpha$. The equivalent wheel speed calculated as above may be used in Formula 2.

Here, in the case of a vehicle provided with an ordinary transmission having a fixed number of gear ratios, the motor-wheel gear ratio r reflects a gear ratio of the transmission, i.e., the gear ratio of the current shift stage. The equivalent wheel speed $\omega_w^*$ is a wheel speed converted in consideration of the current shift stage of the transmission while being equivalent to the motor speed.

The wheel speed offset correction factor $\alpha$ is a correction factor intended to cope with an insignificant variation in an actual gear ratio occurring due to wear or replacement of a tire and reflect the insignificant variation in the gear ratio.

In addition, the wheel speed offset correction factor $\alpha$ has an initial value of 1. The wheel speed offset correction factor $\alpha$ is obtained by averaging and integrating differences between observed motor speeds and the equivalent wheel speed over time, starting with the initial value of 1.

However, any difference obtained during gear shifting as in a case in which the shifting status of the transmission is in an actual transmission range or obtained during motor-wheel slip, such as creeping state of the vehicle, will be omitted.

In addition, according to embodiments of the present disclosure, motor observation values, i.e., the observed motor speed (or predicted motor speed) $\hat{\omega}_m$ and the observed output torque $\hat{T}_t$, may be determined through the calculation process using Formulas 1 and 2. A difference between the observed motor speed and the equivalent wheel speed is defined as a drive system torsional speed.

In addition, since not only the torsional velocity but also torsional acceleration is observed, it is not necessary to calculate the torsional acceleration using an additional differential formula, and a torsion angle may be obtained by integrating the observed torsional velocity.

In addition, the torsional speed (i.e., a torsional angular velocity), the torsional acceleration (i.e., torsional angular acceleration), and the torsion angle obtained by the torsion observer 113 are the torsional state observation values obtained by observing (or predicting) the torsional state of the drive system using the measured motor speed, the measured wheel speed, and the motor torque command. The torsional state observation values are input to the second torque command generator 114.

The second torque command generator 114 obtains a sum of products obtained by multiplying the torsional state observation values with control gains, and sets the sum as a feedback torque command.

That is, when the second torque command generator 114 generates the feedback torque command corresponding to the torsional state, based on the torsional speed, the torsional acceleration, and the torsion angle, the second torque command generator 114 obtains a sum of the products obtained by multiplying the torsional speed, the torsional acceleration, and the torsion angle with the control gains, respectively, and sets the sum as the feedback torque command.

Afterwards, the feedback torque command generated by the second torque command generator 114 is transferred to the motor torque command generator 115.

The motor torque command generator 115 receives the feedforward torque command output by the first torque command generator 112 and the feedback torque command output by the second torque command generator 114, and generates the final motor torque command from the feedforward torque command and the feedback torque command input thereto.

Here, the motor torque command generator 115 generates the motor torque command from a sum of the feedforward torque command and the feedback torque command. That is, a sum is obtained by adding the feedforward torque command determined based on the driving input values input by the driver and the feedback torque command determined based on the torsional state observation values, and the sum is determined as the motor torque command.

Consequently, the motor torque command finally determined by the motor torque command generator 115 is input to a motor control unit (MCU, not shown), and is used by the motor control unit to control the operation of the motor.

The driving torque command generating apparatus and method according to the present disclosure have been described as set forth above. According to the present disclosure, the feedback torque command is generated in the above-described manner only when a wheel speed can be converted into a wheel speed from the point of view of the motor, i.e., an equivalent wheel speed.

In particular, the feedback torque command is generated only when a current gear ratio can be defined as a specific value without continuously varying.

In contrast, in a vehicle provided with an ordinary transmission having a fixed number of gear ratios, when the current shifting status is in an actual transmission range (or in a shift inertia phase) or a correct gear ratio cannot be defined due to slip, such as creeping, the second torque command generator 114 stops generating the feedback torque command.

In addition, the torsion observer 113 stores the torsional state observation value finally generated at a point in time at which the generation of the feedback torque command is stopped, and the second torque command generator 114 generates the feedback torque command using the torsional state observation values stored in the torsion observer 113 as initial values at a later point in time at which the generation of the feedback torque command is resumed, so that convergence is ensured and significant changes in the torque command and the motor torque and resultant impacts can be minimized when the generation and application of the feedback torque command is resumed after the generation of the feedback torque command is stopped.

Since the feedback torque command is not generated by the second torque command generator 114 when the generation of the feedback torque command is stopped, as described above, the motor torque command generator 115 determines the motor torque command generator 115 by the first torque command generator 112 as the final motor torque command, and the operation of the motor is controlled only based on the feedforward torque command.

In addition, according to a modified example, an input to the torsion observer 113 functioning as an observer may be substituted with other pieces of information, such as motor current, a motor voltage, an engine ignition angle, an engine ignition time, an intake amount, a position (or a connection or disconnection state) or pressure of an engine clutch, or the like.

In addition, feedback information input to the torsion observer 113 functioning as an observer may be the equivalent wheel speed or the engine speed, in place of the measured motor speed.

In addition, a drive system torsional damping characteristic may be used for the feedforward term in Formula 2 with which the torsion observer 113 obtains the observation output torque, in place of the drive system torsional stiffness. The torsion angle may be used for the output torque term, instead that the torsional speed is used for the differential term of the output torque.

Furthermore, the torsional state observation values may be obtained by observing the wheel speed, in place of observing the motor speed. Otherwise, a method of combining a motor speed observer and a wheel speed observer may be applied.

In addition, conditions for adjusting the wheel speed offset correction factor may be substituted with other conditions, such as engagement/disengagement of the clutch, which can be determined using actuator information regarding the engine clutch or the transmission clutch, in addition to the above-stated shifting and creeping conditions.

Described with reference to the above formulas, the torsion observer 113 uses the drive system torsional stiffness or damping characteristics as the feedforward of the output torque to obtain the output torque necessary in Formula 2, thereby applying an output torque change rate for the feedforward term.

In addition, an observed speed change rate is corrected by multiplying the difference between an observed speed and a measured speed with a feedback gain, as expressed in the above formula, using measured speeds of the drive system, such as the motor, wheels, and engine, in order to prevent the divergence of the observed speed.

In addition, the change rate of the output torque is applied as a combination obtained by multiplying the feedforward term and the gain of the feedback term in order to obtain the output torque necessary to the torsion observer As set forth above, according to embodiments of the present disclosure, the driving torque command generating apparatus and method of an eco-friendly vehicle can obtain rapid reaction and response of a vehicle in response to the driving input of the driver (e.g., manipulation of the accelerator pedal by the driver) while effectively reducing NVH problems caused by torsion and backlash of the drive system even in the case in which a significant change in driving force is caused by the driving input.

In addition, according to embodiments of the present disclosure, in the case of overcoming NVH problems caused by torsion and backlash of the drive system, it is possible to overcome the difficulty in setting the torque command filter or torque gradient in a situation-specific manner by considering a number of factors, as well as the excessive number of process steps, which are the problems of the related-art solutions using the torque gradient control and the filter. In addition, since a torque command suitable for a specific point in time can be generated in real-time, an improvement in efficiency can be expected.

Furthermore, according to embodiments of the present disclosure, a driving torque command is generated by previously observing a result of backlash or vibration of the drive system depending on a change in torque before the torque is actually generated. It is, therefore, possible to effectively reduce NVH problems even in the case in which a unique control delay time is present in the motor.

Although certain embodiments of the present disclosure have been described for illustrative purposes, the scope of the present disclosure is not limited thereto. It should be understood that those skilled in the art will appreciate various modifications and improvements without departing from the scope and spirit of the present disclosure as disclosed in the accompanying claims.

What is claimed is:

1. A driving torque command generating apparatus of a vehicle, comprising:
a driving input sensor configured to detect a driving input value of a driver, including a pedal input value, in response to a manipulation of an accelerator pedal of the vehicle;
a motor speed sensor configured to detect a motor speed of a drive motor of the vehicle;
a wheel speed sensor configured to detect a wheel speed of a wheel of the vehicle; and
a controller configured to obtain a torsional state observation value, which indicates a torsional state observation value information derived from a vehicle drive system of the vehicle, according to the detected motor speed, the detected wheel speed, and a previously-generated motor torque command, and to generate a final motor torque command based on the detected driving input value and the obtained torsional state observation value information,
wherein the torsional state observation value includes a torsional speed, and
wherein the controller is further configured to observe a motor speed of the drive motor based on the detected motor speed, the detected wheel speed, and the final motor torque command, and to calculate the torsional speed based on a difference between the observed motor speed and an equivalent wheel speed obtained by multiplying the detected wheel speed with a motor-wheel gear ratio and a wheel speed offset correction factor.

2. The driving torque command generating apparatus according to claim 1, wherein the controller is further configured to:
generate a target torque for controlling the drive motor based on the driving input value, and to output the target torque;
determine a torque gradient based on vehicle status information collected from the vehicle, to generate a feedforward torque command based on the generated target torque, and to output the feedforward torque command;

generate the torsional state observation value according to a torsional state of the vehicle drive system, and to output the torsional state observation value;

generate a feedback torque command for reducing torsion of the vehicle drive system based on the torsional state observation value, and to output the feedback torque command; and a motor torque command generator configured to generate the previously-generated motor torque command, to generate the final motor torque command based on the feedforward torque command and the feedback torque command, and to output the final motor torque command.

3. The driving torque command generating apparatus according to claim 2, wherein the controller is further configured to generate the final motor torque command by correcting the feedforward torque command according to a torsion-reducing feedback torque command.

4. The driving torque command generating apparatus according to claim 2, wherein the feedback torque command includes a command for generating a drive motor torque in a direction able to reduce the torsion of the vehicle drive system, and the controller is further configured to generate the final motor torque command by adding the feedforward torque command to the feedback torque command.

5. The driving torque command generating apparatus according to claim 2, wherein
the torsional state observation value includes the torsional speed, a torsional acceleration, and a torsion angle, and
the controller is further configured to calculate the torsional acceleration according to a differentiation value of the torsional speed, and to calculate the torsion angle according to an integration value of the torsional speed.

6. The driving torque command generating apparatus according to claim 5, wherein
the controller is further configured to calculate the torsional speed, which is the difference between the observed motor speed and the equivalent wheel speed, and the torsional acceleration using the following formulas:

$$\dot{\hat{\omega}}_m = \frac{1}{J_m} T_{in} - \frac{1}{J_m} \hat{T}_t + L_p(\omega_m - \hat{\omega}_m), \text{ and}$$

$$\dot{\hat{T}}_t = k_t(\omega_m - \omega_w^*) - L_i(\omega_m - \hat{\omega}_m),$$

wherein $\hat{\omega}_m$ is the torsional speed, $\hat{T}_t$ is the torsional acceleration, $J_m$ is a motor rotational inertia, $\omega_m$ is a measured motor speed, $k_t$ is drive system torsional stiffness, $\hat{\omega}_m$ is the observed motor speed, $L_p$ is an observer feedback P-gain, $\omega_w$ is a measured wheel speed, $L_i$ is an observer feedback I-gain, $\omega_w^*$ is the equivalent wheel speed, $\hat{T}_t$ is an observed output torque, and $T_{in}$ is an input torque command, wherein the measured motor speed, the measured wheel speed, and the input torque command are the detected motor speed, the detected wheel speed, and the final motor torque command, respectively, and the controller is configured to calculate the torsion angle according to the calculated torsional speed.

7. The driving torque command generating apparatus according to claim 6, wherein
the controller is further configured to store a final torsional state observation value generated when the generation of the feedback torque command is stopped, and the controller is further configured to generate the feedback torque command using the stored final torsional state observation value as an initial value when the generation of the feedback torque command is resumed after being stopped.

8. The driving torque command generating apparatus according to claim 5, wherein the controller is further configured to calculate the wheel speed offset correction factor by averaging differences between the observed motor speed and the equivalent wheel speed over time, starting from an initial value of 1.

9. The driving torque command generating apparatus according to claim 8, wherein the averaged differences between the observed motor speed and the equivalent wheel speed over time does not include a difference obtained when a shifting status of a transmission of the vehicle is in an actual transmission range or a difference obtained during a creeping operation of the vehicle.

10. The driving torque command generating apparatus according to claim 5, wherein the controller is further configured to generate the feedback torque command according to a sum of products by multiplying the torsional speed, the torsional acceleration, and the torsion angle with predetermined corresponding control gains.

11. The driving torque command generating apparatus according to claim 5, wherein the controller is further configured to stop generating the feedback torque command when a shifting status of a transmission of the vehicle is in an actual transmission range or the vehicle performs a creeping operation.

12. A driving torque command generating method of a vehicle, comprising:
detecting, by a driving input sensor, a driving input value of a driver, including a pedal input value, in response to a manipulation of an accelerator pedal of the vehicle;
detecting, by a motor speed sensor, a motor speed of a drive motor of the vehicle;
detecting, by a wheel speed sensor, a wheel speed of a wheel of the vehicle;
obtaining, by a controller, a torsional state observation value information, which indicates a torsional state observation value derived from a vehicle drive system of the vehicle, according to the detected motor speed, the detected wheel speed, and a previously-generated motor torque command; and
generating, by the controller, a final motor torque command based on the detected driving input value and the obtained torsional state observation value information,
wherein the torsional state observation value includes a torsional speed, and
wherein the controller is configured to observe a motor speed of the drive motor based on the detected motor speed, the detected wheel speed, and the final motor torque command, and to calculate the torsional speed based on a difference between the observed motor speed and an equivalent wheel speed obtained by multiplying the detected wheel speed with a motor-wheel gear ratio and a wheel speed offset correction factor.

13. The driving torque command generating method according to claim 12, wherein generating of the motor torque command comprises:
generating a target torque for controlling the drive motor based on the driving input value;
determining a torque gradient based on vehicle status information collected from the vehicle;

generating a feedforward torque command based on the generated target torque;

generating the torsional state observation value according to a torsional state of the vehicle drive system;

generating a feedback torque command for reducing torsion of the vehicle drive system based on the torsional state observation value; and generating a final motor torque command based on the feedforward torque command and the feedback torque command.

14. The driving torque command generating method according to claim 13, further comprising generating the final motor torque command by correcting the feedforward torque command according to a torsion-reducing feedback torque command.

15. The driving torque command generating method according to claim 13, further comprising generating the final motor torque command by adding the feedforward torque command to the feedback torque command, wherein the feedback torque command includes a command for generating a drive motor torque in a direction able to reduce the torsion of the vehicle drive system.

16. The driving torque command generating method according to claim 13, wherein the generating of the torsional state observation value, which includes the torsional speed, a torsional acceleration, and a torsion angle, comprises:

calculating the torsional acceleration according to a differentiation value of the torsional speed; and calculating the torsion angle according to an integration value of the torsional speed.

17. The driving torque command generating method according to claim 16, further comprising calculating the torsional speed, which is the difference between the observed motor speed and the equivalent wheel speed, and the torsional acceleration using the following formulas:

$$\dot{\hat{\omega}}_m = \frac{1}{J_m} T_{in} - \frac{1}{J_m} \hat{T}_t + L_p(\omega_m - \hat{\omega}_m), \text{ and}$$

$$\dot{\hat{T}}_t = k_t(\omega_m - \omega_w^*) - L_i(\omega_m - \hat{\omega}_m),$$

wherein $\hat{\omega}_m$ is the torsional speed, $\hat{T}_t$ is the torsional acceleration, $J_m$ is a motor rotational inertia, $\omega_m$ is a measured motor speed, $k_t$ is drive system torsional stiffness, $\hat{\omega}_m$ is the observed motor speed, $L_p$ is an observer feedback P-gain, $\omega_w$ is a measured wheel speed, $L_i$ is an observer feedback I-gain, $\omega_w^*$ is the equivalent wheel speed, $\hat{T}_t$ is an observed output torque, and $T_{in}$ is an input torque command, wherein the measured motor speed, the measured wheel speed, and the input torque command are the detected motor speed, the detected wheel speed, and the final motor torque command, respectively, and wherein the torsion angle is calculated according to the calculated torsional speed.

18. The driving torque command generating method according to claim 16, further comprising calculating the wheel speed offset correction factor by averaging differences between the observed motor speed and the equivalent wheel speed over time, starting from an initial value of 1.

19. The driving torque command generating method according to claim 18, wherein the averaged differences between the observed motor speed and the equivalent wheel speed over time does not include a difference obtained when a shifting status of a transmission of the vehicle is in an actual transmission range or a difference obtained during a creeping operation of the vehicle.

20. The driving torque command generating method according to claim 16, further comprising generating the feedback torque command according to a sum of products by multiplying the torsional speed, the torsional acceleration, and the torsion angle with predetermined corresponding control gains.

21. The driving torque command generating method according to claim 16, further comprising stopping generation of the feedback torque command when a shifting status of a transmission of the vehicle is in an actual transmission range or the vehicle performs a creeping operation.

22. The driving torque command generating method according to claim 21, further comprising:

storing a final torsional state observation value generated when the generation of the feedback torque command is stopped; and generating the feedback torque command using the stored final torsional state observation value as an initial value when the generation of the feedback torque command is resumed after being stopped.

* * * * *